United States Patent
Mozer et al.

(10) Patent No.: US 9,432,193 B1
(45) Date of Patent: Aug. 30, 2016

(54) FACE-BASED AUTHENTICATION WITH SITUATIONAL ADAPTIVITY

(71) Applicant: Sensory, Incorporated, Santa Clara, CA (US)

(72) Inventors: Todd F. Mozer, Los Altos, CA (US); Bryan Pellom, Erie, CO (US)

(73) Assignee: Sensory, Incorporated, Santa Clara, CA (US)

( * ) Notice: Subject to any disclaimer, the term of this patent is extended or adjusted under 35 U.S.C. 154(b) by 0 days.

(21) Appl. No.: 14/614,765

(22) Filed: Feb. 5, 2015

(51) Int. Cl.
*G06K 9/00* (2006.01)
*H04L 9/32* (2006.01)

(52) U.S. Cl.
CPC ............ *H04L 9/3231* (2013.01); *G06K 9/00* (2013.01); *G06K 9/00261* (2013.01); *G06K 9/00268* (2013.01); *G06K 9/00295* (2013.01); *G06K 9/00926* (2013.01)

(58) Field of Classification Search
CPC ...... G06F 21/32; G06F 21/31; G06F 17/248; G06F 21/34; G06F 2221/2133; G06F 21/6245; G06F 2221/2117; G06F 21/316; G06K 9/00221; G06K 9/00597; G06K 9/2018; G06K 9/6256; G06K 9/00281; G06K 9/6217; G06K 9/00214; G06K 9/00315; G06K 9/00288; G06K 2009/00328; G06K 9/00268; G06K 9/00261; H04L 63/0861; H04L 9/3231; H04L 9/3278; G07C 9/00071; G07C 9/00087; G07C 9/00158; G06Q 20/40145; Y04S 40/24; A61B 5/082
USPC ................ 382/103, 115, 117, 118; 351/204; 713/186; 348/208, 229
See application file for complete search history.

(56) References Cited

U.S. PATENT DOCUMENTS

| | | | | |
|---|---|---|---|---|
| 8,364,971 B2 * | 1/2013 | Bell | .................. | G06F 21/32 382/117 |
| 8,396,265 B1 * | 3/2013 | Ross | .................. | G06K 9/00214 382/103 |
| 8,515,139 B1 * | 8/2013 | Nechyba | ............. | G06K 9/6256 382/115 |
| 8,886,953 B1 * | 11/2014 | Sipe | ........................ | G06F 21/32 713/186 |
| 2004/0056966 A1 * | 3/2004 | Schechner | ............ | G06T 7/0018 348/229.1 |
| 2009/0316012 A1 * | 12/2009 | Matos | ................ | H04N 1/00323 348/208.14 |
| 2010/0299530 A1 * | 11/2010 | Bell | ........................ | G06F 21/32 713/186 |
| 2011/0099385 A1 * | 4/2011 | Takahashi | ................ | G06F 21/32 713/186 |
| 2012/0185698 A1 * | 7/2012 | Fiske | ...................... | G06F 21/32 713/186 |
| 2013/0247175 A1 * | 9/2013 | Nechyba | .................. | G06F 21/32 726/19 |
| 2014/0283022 A1 * | 9/2014 | Beloncik | .................. | G06F 21/32 726/19 |
| 2015/0212063 A1 * | 7/2015 | Wojcik | ............... | G01N 33/4972 340/576 |

* cited by examiner

Primary Examiner — Vu Le
Assistant Examiner — Aklilu Woldermariam
(74) Attorney, Agent, or Firm — Fountainhead Law Group P.C.

(57) ABSTRACT

Techniques for implementing face-based authentication with situational adaptivity are provided. In one embodiment, a computing device can create an enrollment template for a user, the enrollment template being derived from one or more enrollment images of the user's face and being usable by a face-based authentication system to authenticate the user's identity. The computing device can further determine a first set of metadata associated with the enrollment image (s) and can store the first set of metadata with the enrollment template. At a later time (e.g., an authentication event), the computing device can capture an input image of the user's face, determine a second set of metadata associated with the input image, and calculate a computational distance between the input image and the enrollment template, the calculating taking into account a degree of difference between the first and second sets of metadata. Finally, the user can be authenticated based on the distance.

19 Claims, 5 Drawing Sheets

FACE-BASED AUTHENTICATION WITH SITUATIONAL ADAPTIVITY

BACKGROUND

In recent years, face-based authentication has become a popular alternative to password, PIN, and pattern-based authentication for implementing security (e.g., device or app unlock functions) on mobile and wearable devices. Face-based authentication offers a number of advantages over those other authentication methods, such as greater ease of use (since there is no need for users to remember security metadata), better flexibility (since it can be implemented on devices with smaller screens, like smartwatches), and improved security (since facial biometric data cannot be as easily stolen or compromised as, e.g., user-selected passwords or PINs).

In a conventional face-based authentication workflow, a mobile/wearable device captures one or more input images of a user that wishes to be authenticated (i.e., an "unknown user"), detects the location of the unknown user's face in the input images, and extracts texture-based features from the detected locations that compactly represent the unknown user's face. The device then compares the extracted features with corresponding features included in one or more enrollment templates for an enrolled device user. If the computational distance between the extracted features and the template features is small (indicating that the unknown user's face is similar to the enrolled user's face as represented in the enrollment templates), the unknown user is verified as being the enrolled user and thus is allowed to perform a secured action (e.g., unlock the device). On the other hand, if the computational distance between the extracted features and the template features is large (indicating that the unknown user's face is not similar to the enrolled user's face as represented in the enrollment templates), the unknown user is rejected as being an imposter and thus is prevented from performing the secured action.

Generally speaking, the enrollment templates noted above are created from digital images of the enrolled user's face that are captured during an initial enrollment process. In order to maximize the likelihood that these templates accurately represent the facial characteristics of the enrolled user, the user is typically asked during the enrollment process to carefully control the conditions under which the enrollment images are captured. For example, the enrolled user may be asked to find a well-lit location to ensure that the images are well exposed. As another example, in scenarios where the camera is mounted on the device, the enrolled user may be asked to hold the device steady, and at a particular distance/orientation, to ensure that his/her face is centered and square with respect to the device camera.

One problem with carefully controlling the enrollment environment as described above is that, in many cases, the authentication environment (i.e., the environment in which face-based authentication is performed) will be significantly different from the enrollment environment. For instance, at the time of an authentication event, the unknown user may be in an extremely dark or extremely bright environment, may present a different head pose (e.g., head turned to the left or right), may hold the mobile/wearable device at a different angle/tilt, may be actively moving, may be wearing different head/face accessories, and so on. All of these differences between the enrollment and authentication environments can degrade the accuracy of the device's conventional face-based authentication system, since the system relies on [template, input image] distance scoring that is easily influenced by these factors.

It is possible to work around this problem to an extent by creating multiple enrollment templates per enrolled user, each corresponding to a different possible authentication environment. However, such a workaround would make the enrollment process significantly more cumbersome and lengthy. In addition, current mobile and wearable devices are generally constrained in terms of their local memory and processing resources. Because of these constraints, such devices may not have the ability to store and evaluate a large number of enrollment templates at the time of authentication.

SUMMARY

Techniques for implementing face-based authentication with situational adaptivity are provided. In one embodiment, a computing device can create an enrollment template for a user, where the enrollment template is derived from one or more enrollment images of the user's face, and where the enrollment template is usable by a face-based authentication system to authenticate the user's identity. The computing device can further determine a first set of metadata associated with the one or more enrollment images and can store the first set of metadata with the enrollment template.

At a later time (e.g., an authentication event), the computing device can capture an input image of the user's face and determine a second set of metadata associated with the input image. The computing device can then calculate a computational distance between features extracted from the input image and the enrollment template, where the calculating takes into account a degree of difference between the first set of metadata and the second set of metadata. Finally, the computing device can determine whether to authenticate the user based on the computational distance.

A further understanding of the nature and advantages of the embodiments disclosed herein can be realized by reference to the remaining portions of the specification and the attached drawings.

DETAILED DESCRIPTION

Figure 1:
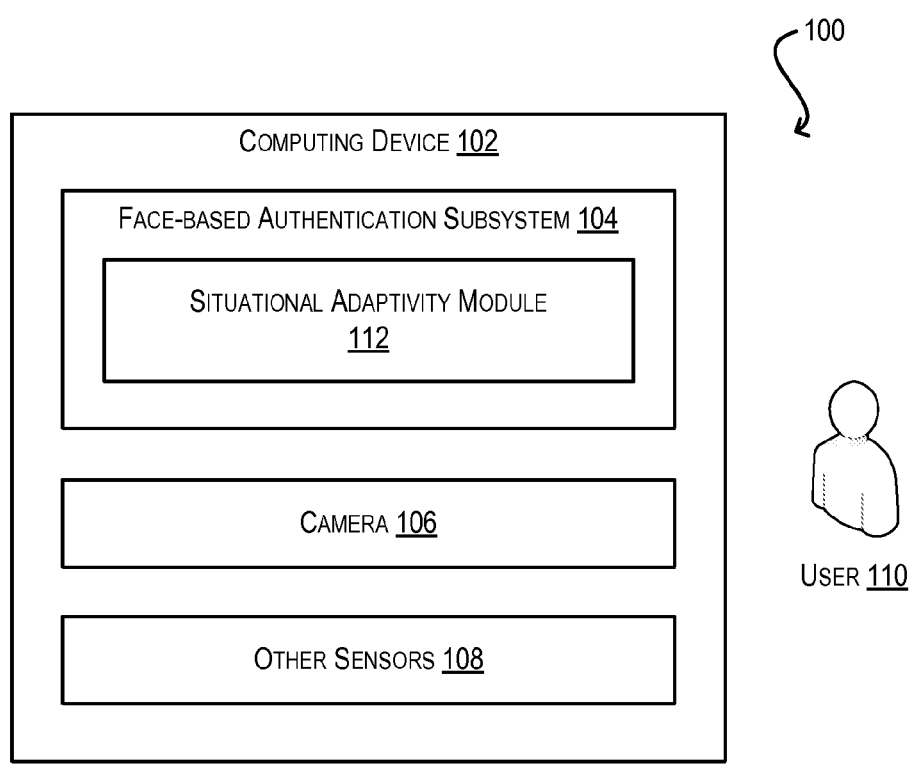
FIG. 1 depicts a system environment that supports face-based authentication with situational adaptivity according to an embodiment.

In the following description, for purposes of explanation, numerous examples and details are set forth in order to provide an understanding of specific embodiments. It will be evident, however, to one skilled in the art that certain embodiments can be practiced without some of these details, or can be practiced with modifications or equivalents thereof.

1. Overview

The present disclosure describes techniques for augmenting face-based authentication with "situational adaptivity"

in order to improve the recognition accuracy of computing devices (e.g., mobile and wearable devices) that use such authentication systems. At a high level, these techniques involve determining, by a computing device upon creating a facial enrollment template for an enrolled user, a first set of metadata that reflects environmental or situational conditions at the time of enrollment. For example, the first set of metadata may comprise sensor measurements captured by the computing device contemporaneously with the enrollment face images (e.g., camera/device orientation, device location, device velocity, ambient brightness, time of day, etc.). Alternatively or in addition, the first set of metadata may comprise information derived by applying image processing algorithms to the enrollment face image(s) (e.g., determining whether the enrolled user is a male/female/child, or determining whether the enrolled user is wearing any face or head accessories, such as eyeglasses, sunglasses, hat, earrings, makeup, etc.). The computing device can store this first set of metadata as part of the enrollment template.

Then, at an authentication event, the computing device can receive one or more input images of an unknown user's face and can determine a second set of metadata that reflects environmental or situational conditions at the time of authentication. The second set of metadata can comprise measurements or information that directly correspond to the measurements/information in the first set of metadata. For example, if the first set of metadata includes a measurement regarding the device's location at the time the enrollment image(s) were captured, the second set of metadata can include an analogous measurement regarding the device's location at the time the input image(s) were captured.

Upon determining the second set of metadata, the computing device can calculate a computational distance between facial features extracted from the input image and the enrollment template, where the calculation takes into account a degree of difference between the first and second sets of metadata. For instance, returning to the example above, if the first and second sets of metadata indicate that the authentication is taking place in the same location where the enrollment process took place, it is more likely that the unknown user is, in fact, the enrolled user and thus the computing device can tweak or modify its distance scoring calculation to increase the likelihood that a positive recognition result is obtained. On the other hand, if the first and second sets of metadata indicate that the authentication is taking place halfway across the world from the location where the enrollment process took place, it is less likely that the unknown user is the enrolled user and thus the computing device can tweak/modify its distance scoring calculation to decrease the likelihood that a positive recognition result is obtained.

Finally, the computing device can determine whether to authenticate the unknown user (or not) based on the computed distance.

By conditioning the distance calculation performed at the time of authentication on environmental/situational metadata (e.g., sensor-derived measurements or image-derived characteristics), the techniques of the present invention can avoid scenarios where drastic changes between the enrollment and authentication environments result in an erroneous recognition/authentication result. This, in turn, can significantly increase the accuracy of the face-based authentication system, which has beneficial downstream effects such as improved user satisfaction and adoption. Further, since these techniques require the addition of only a small amount of metadata per enrollment template, they can be easily implemented on devices with limited memory/compute resources, such as mobile and wearable devices.

In certain embodiments, in addition to performing the workflows described above, a computing device that implements the techniques of the present invention can also periodically create a new enrollment template for a user based on input image(s) received at an authentication event if: (a) the user's identity is verified (through face-based authentication or an alternative authentication method), and (b) the degree of difference between the first set of metadata (corresponding to the existing enrollment template(s)) and the second set of metadata (corresponding to the input image(s)) is relatively large (e.g., beyond a predefined threshold). In this way, the computing device can automatically increase the diversity of templates used to model the user's facial characteristics, without requiring explicit user input or additional enrollment sessions.

These and other features are described in further detail in the sections that follow.

2. System Environment

FIG. 1 depicts a high-level system environment 100 that supports face-based authentication with situational adaptivity according to an embodiment. As shown, system environment 100 includes a computing device 102 comprising a face-based authentication subsystem 104, a camera 106, and other sensors 108. In one set of embodiments, computing device 102 can be a mobile device, such as a smartphone, a tablet, or a wearable device (e.g., smartwatch, smart armband/wristband, etc.). Computing device 102 can also be any other type of electronic device, such as a desktop computer system, laptop, set-top or home automation/security box, or the like. Sensors 108 can include, e.g., a gyroscope, an accelerometer, an ambient light sensor, a microphone, a Global Positioning System (GPS) module, a thermometer, a barometer, and any other sensors known in the art.

In operation, computing device 102 can use face-based authentication subsystem 104 to secure one or more functions on device 102. For example, assume computing device 102 is a smartphone that includes a "device unlock" function secured via subsystem 104. In this case, face-based authentication subsystem 104 can require a user (e.g., user 110) that wishes to unlock the device to present his/her face to device camera 106. Camera 106 can capture one or more input images of user 110's face and provide the input images to subsystem 104. Face-based authentication subsystem 104 can then extract texture-based facial features (e.g., Local Binary Pattern features) from the input images, calculate a computational distance between the extracted features and corresponding features stored in facial enrollment templates for one or more enrolled device users, and determine, based on that calculation, whether the identity of user 110 can be verified. If so, user 110 is authenticated and allowed to unlock computing device 102. If the identity of user 110 cannot be verified, the user is rejected as an imposter and computing device 102 remains locked.

As noted the Background section, one limitation with existing face-based authentication systems is that they generally perform poorly when an unknown user attempts to authenticate himself/herself in an environment that is substantially different from the environment in which the enrollment templates of the system were initially created/captured. This is because such environmental differences can cause significant variances in the computational distances that are calculated during authentication, even when the unknown user is in fact an enrolled user.

To address the foregoing and other similar issues, face-based authentication subsystem 104 of FIG. 1 includes a novel situational adaptivity (SA) module 112. SA module 112 can be implemented in software, hardware, or a combination thereof. As described in further detail below, SA module 112 can determine (using, e.g., various sensors 108) differences between the environmental/situational conditions that exist at the time of enrolling a particular template and the environmental/situational conditions that exist at the time of authenticating an unknown user. For example, SA module 112 can determine that the ambient lighting in the authentication environment is X units lower than the ambient lighting in the enrollment environment, the geolocation of device 102 in the authentication environment is Y miles away from the geolocation of device 102 in the enrollment environment, and so on. SA module 112 can then enable face-based authentication subsystem 104 to take these differences into consideration when performing [template, input image] distance scoring. For instance, in some embodiments, small differences between the authentication and enrollment environments (indicating that the environments are similar) can cause subsystem 104 to boost the score of the enrollment template (i.e., reduce the computed distance). Conversely, large differences between the authentication and enrollment environments (indicating that the environments are dissimilar) can cause subsystem 104 to reduce the score of the enrollment template (i.e., increase the computed distance), or leave the score unchanged. In this manner, SA module 112 can improve the accuracy of face-based authentication subsystem 104 using these environmental/situational cues beyond what is possible by calculating a conventional [template, input image] distance score.

It should be appreciated that system environment 100 of FIG. 1 is illustrative and not intended to limit embodiments of the present invention. For instance, although face-based authentication subsystem 104 (and SA module 112) are shown as being executed on computing device 102, in other embodiments some (or all) of the processing attributed to 104 and 112 may be performed by a separate device/system (e.g., a remote server). In these embodiments, computing device 102 can transmit face images and/or sensor data captured via camera 106/sensors 108 to the remote server, which can perform authentication processing and return an authentication result to device 102.

Further, although sensors 108 are shown as being integrated into computing device 102, in other embodiments some (or all) of sensors 108 may be resident in another device or housing that is separate from computing device 102. In these and other similar scenarios, sensor data captured via sensors 108 can be relayed to computing device 102 via an appropriate communication link (e.g., a wired or wireless link).

Yet further, the components of system environment 100 can include other subcomponents or features that are not specifically described or shown. One of ordinary skill in the art will recognize many variations, modifications, and alternatives.

3. Enrollment Workflow

Figure 2:
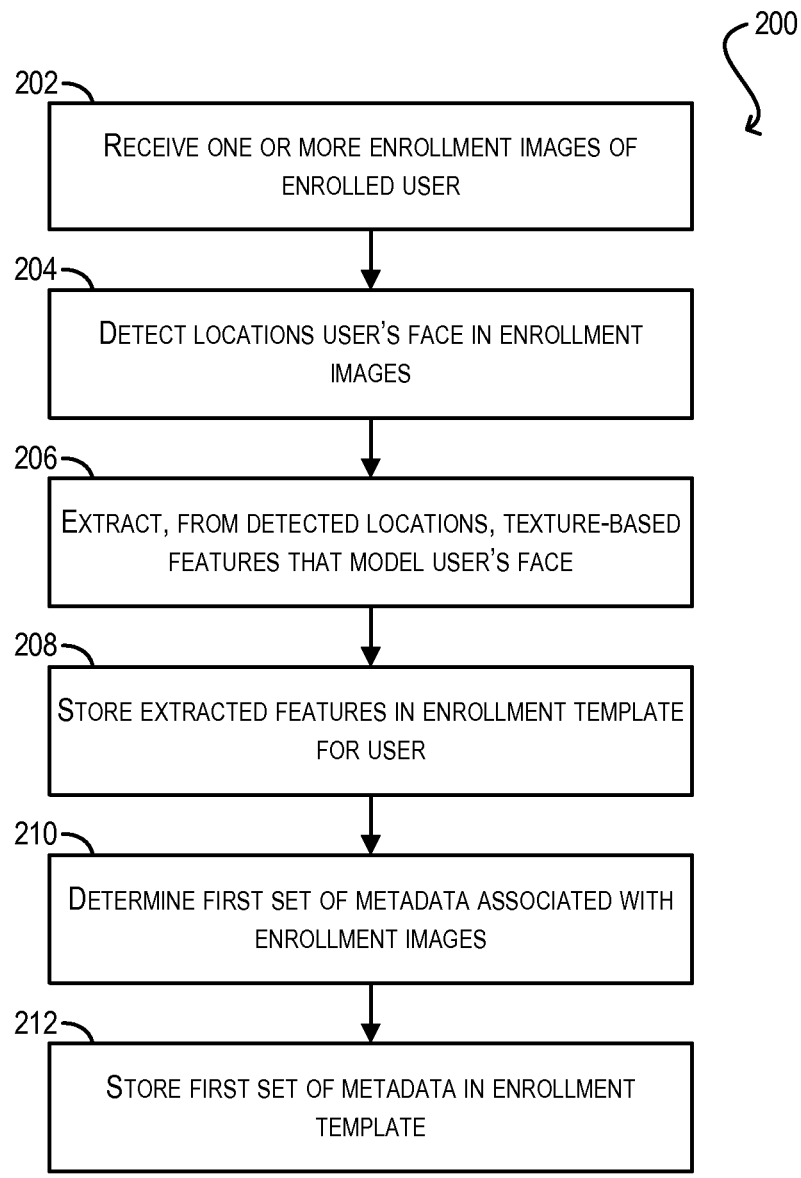
FIG. 2 depicts a flowchart for creating a facial enrollment template according to an embodiment.

FIG. 2 depicts a high-level workflow 200 that can be carried out by face-based authentication subsystem 104 and SA module 112 for enrolling a facial template for a user of computing device 102 according to an embodiment. Starting with blocks 202 and 204, face-based authentication subsystem 104 can receive one or more enrollment images of the user that are captured via, e.g., camera 106, and can detect locations of the user's face in the enrollment images.

At blocks 206 and 208, face-based authentication subsystem 104 can extract, from the detected locations, texture-based features that model the user's face, and can store the extracted features in a newly created enrollment template for the user. One skilled in the art will recognize that there are many types of texture-based features that can be extracted and modeled. For example, one well-known texture-based feature set is the Local Binary Pattern (LBP), which encodes the relative frequency of pixel intensity changes surrounding a square, circular, or elliptical neighborhood around a pixel of interest.

Once the user's facial features have been extracted and stored, SA module 112 of face-based authentication subsystem 104 can determine a first set of metadata associated with the enrollment images received at block 202 (block 210). In one embodiment, this first set of metadata can comprise sensor measurements that are captured (via, e.g., sensors 108) contemporaneously with the enrollment images. For example, the sensor measurements can include:

The orientation of computing device 102 when the enrollment images were captured;

the geolocation of computing device 102 when the enrollment images were captured;

the time of day (e.g., morning, afternoon, night) when the enrollment images were captured;

the ambient brightness when the enrollment images were captured;

the velocity of computing device 102 when the enrollment images were captured (possibly categorized based on relative speed, such as "walking," "running," "driving," etc.); and/or the date and time when the enrollment images were captured.

It should be appreciated that the foregoing list is not meant to be exhaustive and that other measurements will be apparent to one skilled in the art.

Alternatively or in addition to the sensor-based measurements above, the first set of metadata determined at block 210 can further comprise information derived by applying image processing algorithms to the enrollment face images. Examples of such information include:

A determination of whether the enrolled user is a male, female, or child;

a determination of whether the enrolled user is wearing any face or head accessories (e.g., eyeglasses, sunglasses, hat, earrings, facial hair, makeup, etc.); and/or a determination of average pixel intensity in the detected face regions of the enrollment images.

Finally, at block 212 of FIG. 2, SA module 112 can store the determined first set of metadata in the enrollment template for use during a future authentication event. For example, in a particular embodiment, SA module 112 can store the first set of metadata as one or more meta-tags within the template. In other embodiments, SA module 112 can store the first set of metadata in a separate file or data structure that is associated with the template.

4. Authentication Workflow

Figure 3:
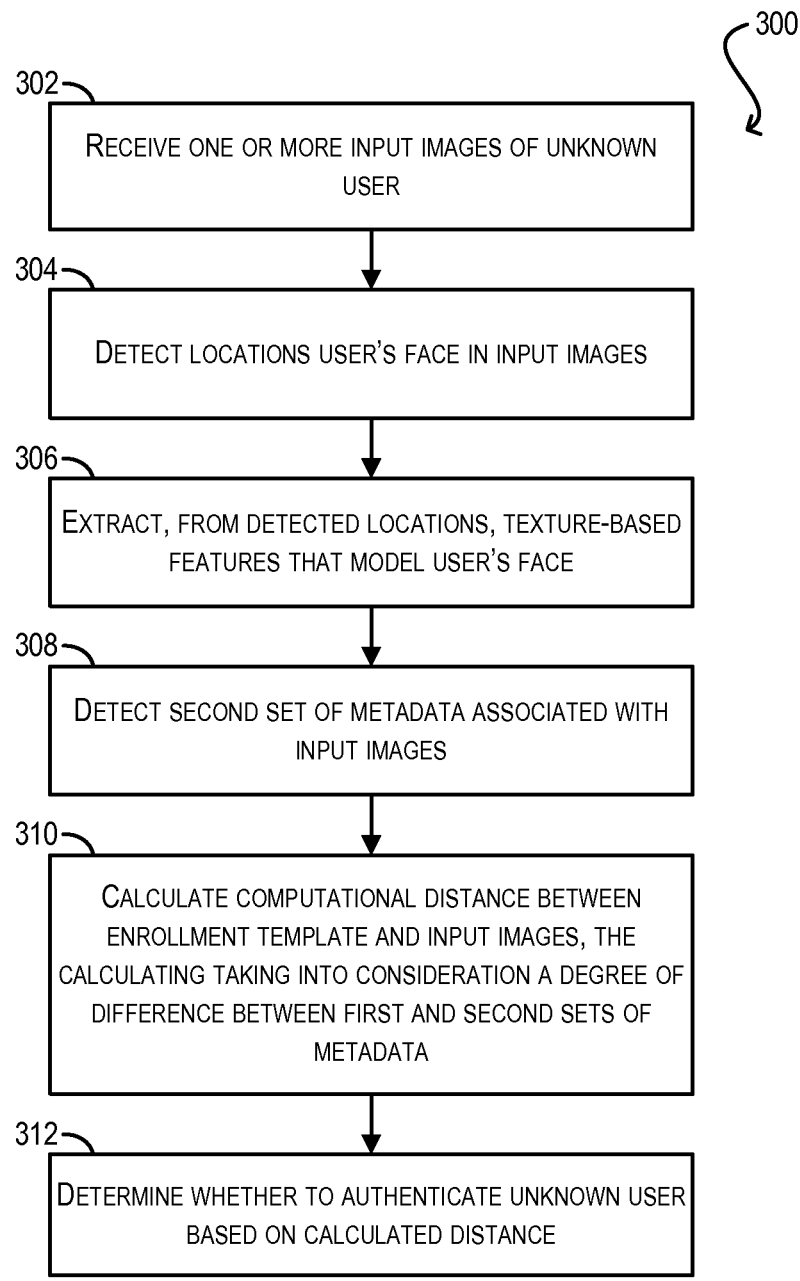
FIG. 3 depicts a flowchart for authenticating an unknown user according to an embodiment.

FIG. 3 depicts a high-level workflow 300 that can be carried out by face-based authentication subsystem 104 and SA module 112 for authenticating an unknown user of computing device 102 in a manner that incorporates situational adaptivity according to an embodiment. Workflow 300 assumes that at least one enrollment template (with associated metadata) has been created per workflow 200 of FIG. 2.

Starting with blocks 302 and 304, face-based authentication subsystem 104 can receive one or more input images of the unknown user that are captured via, e.g., camera 106, and can detect locations of the unknown user's face in the input images.

At block 306, face-based authentication subsystem 104 can extract, from the detected locations, texture-based features that model the unknown user's face. Face-based authentication subsystem 104 can perform this extraction in a manner that is substantially similar to block 206 of FIG. 2. Then, at block 308, SA module 112 can determine a second set of metadata that is associated with the input images. This second set of metadata can comprise sensor measurements and/or information that directly correspond to the first set of metadata determined at block 210 of FIG. 2, but are captured/determined contemporaneously with the input images (rather than the enrollment images). Thus, the second set of metadata can provide a reference point for how those measurements have changed since the time of enrollment. For example, the second set of metadata can include:

The orientation of computing device 102 when the input images were captured;

the geolocation of computing device 102 when the input images were captured;

the time of day (e.g., morning, afternoon, night) when the input images were captured;

the ambient brightness when the input images were captured;

the velocity of computing device 102 when the input images were captured (possibly categorized based on relative speed, such as "walking," "running," "driving," etc.); and/or the date and time when the input images were captured.

Alternatively or in addition, the second set of metadata can include:

A determination of whether the unknown user is a male, female, or child;

a determination of whether the unknown user is wearing any face or head accessories (e.g., eyeglasses, sunglasses, hat, earrings, facial hair, makeup, etc.); and/or a determination of average pixel intensity in the detected face regions of the input images.

Once the second set of metadata has been determined, face-based authentication subsystem 104 can calculate a computational (e.g., Euclidean) distance between the features included in the enrollment template created via workflow 200 of FIG. 2 and the features extracted from the input images at block 306 (block 310). However, unlike conventional face-based authentication systems, subsystem 104 can perform this calculation in a manner that considers the degree of difference between the measurements/information in the first and second sets of metadata respectively. In other words, face-based authentication subsystem 104 can tweak its distance scoring to take into account how much each measurement/data point has changed from the enrollment environment to the authentication environment. Generally speaking, if a particular measurement/data point has not changed significantly, face-based authentication subsystem 104 can boost the score (i.e., reduce the computed distance). On the other hand, if a particular measurement/data point has changed significantly, face-based authentication subsystem 104 can reduce the score (i.e., increase the computed distance), or leave it unchanged.

One of ordinary skill in the art will recognize that there are several ways to adjust the computational distance calculated at block 310 to take into account the differences between the first and second sets of metadata. For example, in one embodiment, subsystem 104 can use logistic regression, where each measurement/data point is used as a predictor variable for deciding the log-odds of whether the unknown user is the enrolled user or an imposter. The weights used for logistic regression can be learned from data using well-known methods (e.g., IRLS, gradient descent, etc.). In another embodiment, subsystem 104 can use multilayer perceptrons, where all knowledge sources are input into a feed-forward neural network and the output of the network is the binary decision of whether the unknown user is the enrolled user or an imposter.

Finally, at block 312, face-based authentication subsystem 104 can determine whether to authenticate the unknown user based on the computational distance calculated at block 310. For instance, if the computational distance is below a certain threshold (or the corresponding distance score is above a certain threshold), the unknown user can be authenticated. Although not shown in FIG. 3, in some cases face-based authentication subsystem 104 may maintain multiple enrollment templates (either for a single enrolled user or multiple enrolled users). In these embodiments, if face-based authentication subsystem 104 determines that the unknown user cannot be authenticated via the current enrollment template at block 312, subsystem 104 can repeat workflow 300 for the remaining enrollment templates until the unknown user can be authenticated (or until all of the enrollment templates are evaluated).

5. Creating Additional Enrollment Templates

Figure 4:
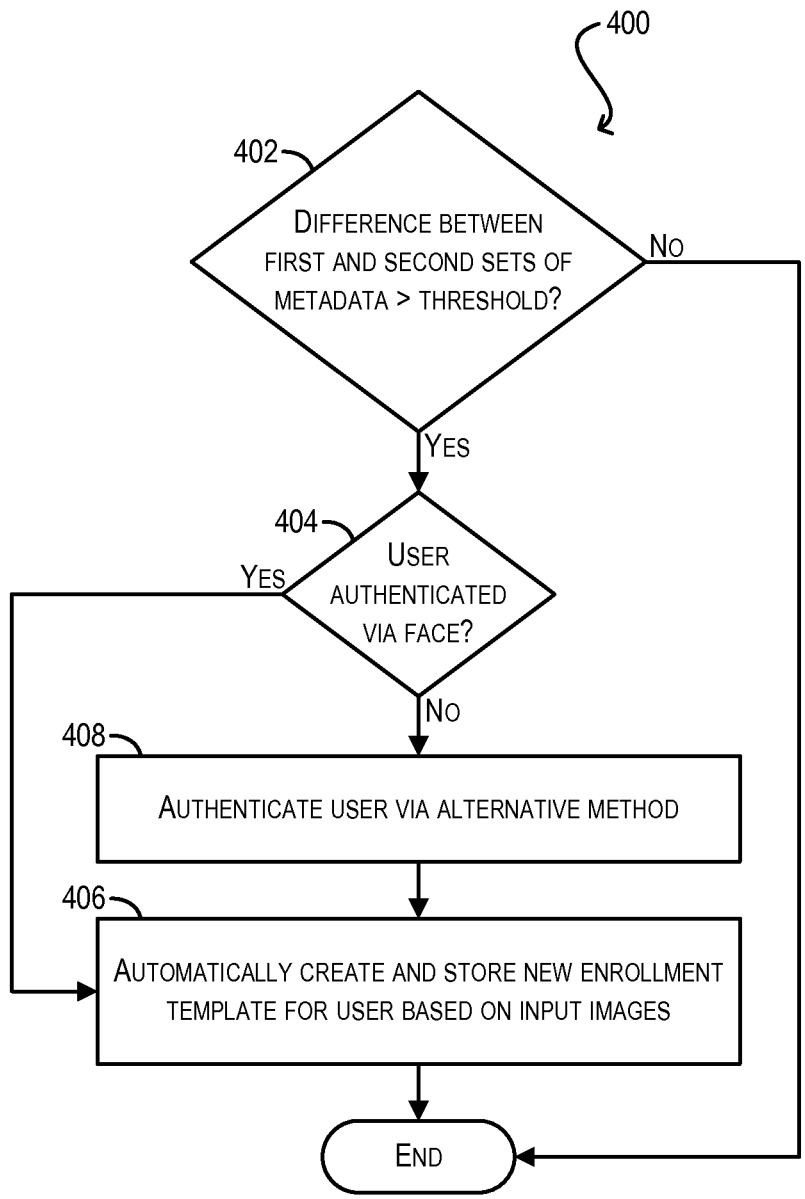
FIG. 4 depicts a flowchart for automatically creating new enrollment templates according to an embodiment.

As mentioned previously, in certain embodiments, SA module 112 can cause face-based authentication subsystem 104 to automatically create and store new enrollment templates for a given user in situations where the user has been authenticated (via face-based authentication or other means) and where there is a large disparity between the first and second sets of metadata (indicating a large difference between the authentication and enrollment environments). In this way, SA module 112 can dynamically increase the diversity of templates for the user, without requiring the user to go through additional, explicit enrollment sessions. FIG. 4 depicts a workflow 400 of this process according to an embodiment. Workflow 400 can be performed immediately after workflow 300 of FIG. 3 during an authentication event.

At block 402, SA module 112 can check whether the degree of difference between the first and second sets of metadata (as determined at block 310 of FIG. 3) is beyond a predefined threshold. If not, workflow 400 can end.

However, if the degree of difference is beyond the threshold, SA module 112 can check whether the user has been authenticated via his/her face (per block 312 of FIG. 3) (block 404). If so, SA module 112 can cause face-based authentication subsystem 104 to automatically create and store a new enrollment template for the user based on the input images captured during the authentication event (block 406).

If the user has not been authenticated via his/her face, SA module 112 can prompt the user to authenticate himself/herself via an alternative method (e.g., password, PIN, pattern, voice, etc.) (block 408). Then, once the user has been authenticated via the alternative method, authentication subsystem 104 can proceed with creating and storing a new enrollment template for the user per block 406.

6. Exemplary Computer Device

Figure 5:
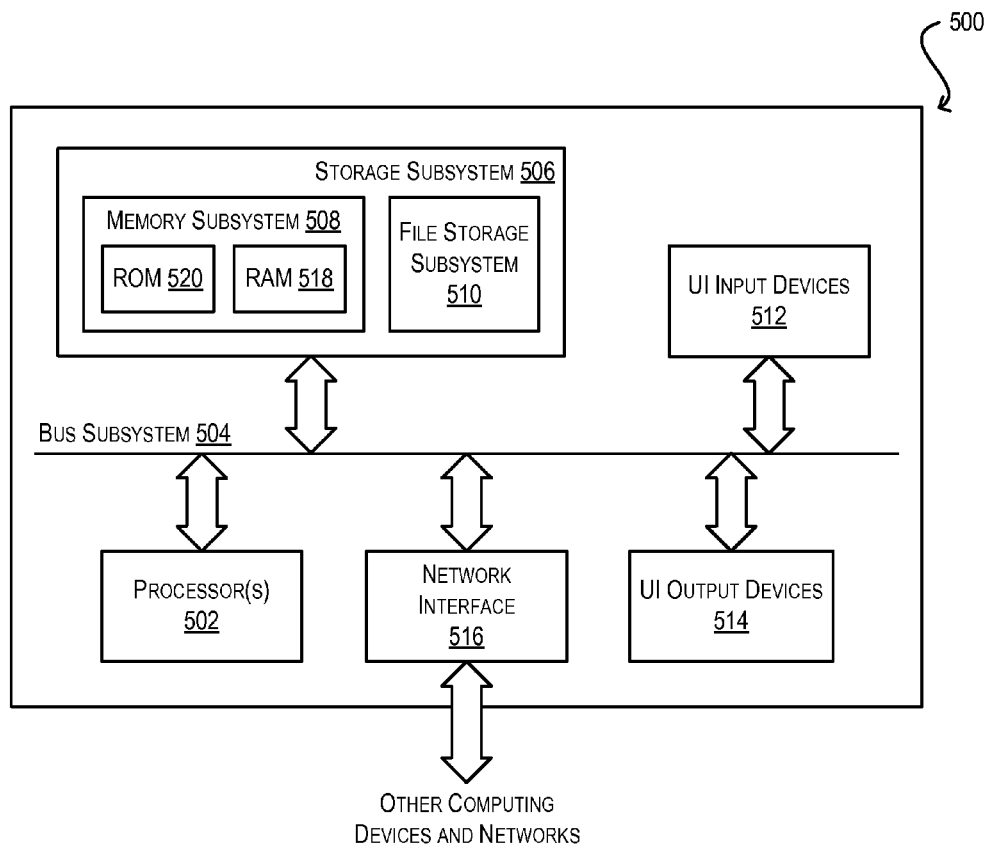
FIG. 5 depicts an exemplary computing device according to an embodiment.

FIG. 5 is a simplified block diagram of a computing device 500 that may be used to implement the foregoing embodiments of the present invention. In particular, device 500 can be used to implement computing device 102 of FIG. 1. As shown, computing device 500 includes one or more processors 502 that communicate with a number of peripheral devices via a bus subsystem 504. These peripheral devices include a storage subsystem 506 (comprising a memory subsystem 508 and a file storage subsystem 510), user interface input devices 512, user interface output devices 514, and a network interface subsystem 516.

Bus subsystem 504 provides a mechanism for letting the various components and subsystems of computing device 500 communicate with each other as intended. Although bus subsystem 504 is shown schematically as a single bus, alternative embodiments of the bus subsystem can utilize multiple busses.

Network interface subsystem 516 serves as an interface for communicating data between computing device 500 and other computing devices or networks. Embodiments of network interface subsystem 516 can include wired (e.g., coaxial, twisted pair, or fiber optic Ethernet) and/or wireless (e.g., Wi-Fi, cellular, Bluetooth, etc.) interfaces.

User interface input devices 512 can include a touch-screen incorporated into a display, a keyboard, a pointing device (e.g., mouse, touchpad, etc.), an audio input device (e.g., a microphone), and/or other types of input devices. In general, use of the term "input device" is intended to include all possible types of devices and mechanisms for inputting information into computing device 500.

User interface output devices 514 can include a display subsystem (e.g., a flat-panel display), an audio output device (e.g., a speaker), and/or the like. In general, use of the term "output device" is intended to include all possible types of devices and mechanisms for outputting information from computing device 500.

Storage subsystem 506 includes a memory subsystem 508 and a file/disk storage subsystem 510. Subsystems 508 and 510 represent non-transitory computer-readable storage media that can store program code and/or data that provide the functionality of various embodiments described herein.

Memory subsystem 508 can include a number of memories including a main random access memory (RAM) 518 for storage of instructions and data during program execution and a read-only memory (ROM) 520 in which fixed instructions are stored. File storage subsystem 510 can provide persistent (i.e., non-volatile) storage for program and data files and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computing device 500 is illustrative and not intended to limit embodiments of the present invention. Many other configurations having more or fewer components than computing device 500 are possible.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims.

For example, although certain embodiments have been described with respect to particular process flows and steps, it should be apparent to those skilled in the art that the scope of the present invention is not strictly limited to the described flows and steps. Steps described as sequential may be executed in parallel, order of steps may be varied, and steps may be modified, combined, added, or omitted.

Further, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the invention as set forth in the following claims.

What is claimed is:

1. A method comprising:
creating, by a processor of a computing device, an enrollment template for a user, the enrollment template being derived from one or more enrollment images of the user's face and being usable by a face-based authentication system to authenticate the user's identity;
determining, by the processor, a first set of metadata associated with the one or more enrollment images, the first set of metadata pertaining to environmental or situational conditions at the time of creating the enrollment template;
storing, by the processor, the first set of metadata with the enrollment template;
capturing, by the processor at a time of user authentication, an input image of the user's face;
determining, by the processor, a second set of metadata associated with the input image, the second set of metadata pertaining to environmental or situational conditions at the time of capturing the input image;
calculating, by the computing device, a computational distance between features extracted from the input image and the enrollment template, wherein the computational distance is increased if a degree of difference between the first set of metadata and the second set of metadata is relatively large, and wherein the computational distance is decreased if the degree of difference between the first set of metadata and the second set of metadata is relatively small; and
determining, by the computing device, whether to authenticate the user based on the computational distance.

2. The method of claim 1 wherein the computing device maintains a plurality of enrollment templates for the user, each enrollment template having its own set of metadata associated with the enrollment images used to create the enrollment template, and
wherein calculating the computational distance and determining whether to authenticate the user based on the computational distance are performed with respect to each enrollment template in the plurality of enrollment templates.

3. The method of claim 1 wherein the first set of metadata comprises first measurements that are derived from one or more sensors of the computing device at a time the one or more enrollment images are captured, and
wherein the second set of metadata comprises second measurements that are derived from the same one or more sensors at a time the input image is captured.

4. The method of claim 3 wherein the first measurements and the second measurements pertain to an orientation of the computing device.

5. The method of claim 4 wherein the first measurements and the second measurements include yaw, pitch, and roll values.

6. The method of claim 1 wherein the first measurements and the second measurements pertain to a geographic location of the computing device.

7. The method of claim 6 wherein the first measurements and the second measurements include GPS coordinates.

8. The method of claim 1 wherein the first measurements and the second measurements pertain to a time of day.

9. The method of claim 1 wherein the first measurements and the second measurements pertain to image brightness of the one or more enrollment images and the input image respectively.

10. The method of claim 1 wherein the first measurements and the second measurements pertain to velocity of the computing device.

11. The method of claim 1 wherein the first measurements and the second measurements pertain to a date and time.

12. The method of claim 1 wherein the first set of metadata comprises first information derived from the one or more enrollment images, and
wherein the second set of metadata comprises second information derived from the input image.

13. The method of claim 12 wherein the first information and the second information pertain to whether the user appears to be a male, female, or child in the one or more enrollment images and the input image respectively.

14. The method of claim 12 wherein the first information and the second information pertain to whether the user is wearing a head or face accessory in the one or more enrollment images and the input image respectively.

15. The method of claim 1 further comprising:
using the input image to create a new enrollment template for the user if the degree of difference between the first set of metadata and the second set of metadata exceeds a threshold.

16. The method of claim 15 wherein, prior to creating the new enrollment template, the user is required to authenticate himself or herself with the computing device using an alternative, non-face-based authentication technique.

17. A non-transitory computer readable medium having stored thereon program code executable by a processor, the program code comprising:
code that causes the processor to create an enrollment template for a user, the enrollment template being derived from one or more enrollment images of the user's face and being usable by a face-based authentication system to authenticate the user's identity;
code that causes the processor to determine a first set of metadata associated with the one or more enrollment images, the first set of metadata pertaining to environmental or situational conditions at the time of creating the enrollment template;
code that causes the processor to store the first set of metadata with the enrollment template;
code that causes the processor to capture, at a time of user authentication, an input image of the user's face;
code that causes the processor to determine a second set of metadata associated with the input image, the second set of metadata pertaining to environmental or situational conditions at the time of capturing the input image;
code that causes the processor to calculate a computational distance between features extracted from the input image and the facial template, wherein the computational distance is increased if a degree of difference between the first set of metadata and the second set of metadata is relatively large, and wherein the computational distance is decreased if the degree of difference between the first set of metadata and the second set of metadata is relatively small; and
code that causes the processor to determine whether to authenticate the user based on the computational distance.

18. A computing device comprising:
a face-based authentication subsystem; and
a processor configured to:
create an enrollment template for a user, the enrollment template being derived from one or more enrollment images of the user's face and being usable by the face-based authentication subsystem to authenticate the user's identity;
determine a first set of metadata associated with the one or more enrollment images, the first set of metadata pertaining to environmental or situational conditions at the time of creating the enrollment template;
store the first set of metadata with the enrollment template;
capture, at a time of user authentication, an input image of the user's face;
determine a second set of metadata associated with the input image, the second set of metadata pertaining to environmental or situational conditions at the time of capturing the input image;
calculate a computational distance between features extracted from the input image and the enrollment template, wherein the computational distance is increased if a degree of difference between the first set of metadata and the second set of metadata is relatively large, and wherein the computational distance is decreased if the degree of difference between the first set of metadata and the second set of metadata is relatively small; and
determine whether to authenticate the user based on the computational distance.

19. The computing device of claim 18 wherein the computing device is a mobile or wearable device.

* * * * *